United States Patent

Scheer

[11] Patent Number: 5,967,007
[45] Date of Patent: Oct. 19, 1999

[54] POSITION DRIVE, IN PARTICULAR FOR USE IN MACHINE TOOLS, AND TOOL HEAD HAVING SUCH A POSITION DRIVE

[75] Inventor: Gerhard Scheer, Loechgau, Germany

[73] Assignee: Komet Praezisionswerkzeuge Robert Breuning GmbH, Besigheim, Germany

[21] Appl. No.: 08/913,474

[22] PCT Filed: Feb. 12, 1996

[86] PCT No.: PCT/DE96/00237

§ 371 Date: Aug. 29, 1997

§ 102(e) Date: Aug. 29, 1997

[87] PCT Pub. No.: WO96/27468

PCT Pub. Date: Sep. 12, 1996

[30] Foreign Application Priority Data

Mar. 3, 1995 [DE] Germany .......................... 195 07 471

[51] Int. Cl.$^6$ .............................................. B23B 41/00
[52] U.S. Cl. .................................. 82/1.5; 82/1.2; 82/86; 82/158; 82/172
[58] Field of Search .............................. 82/1.5, 1.4, 1.2, 82/82, 83, 86, 113, 119, 154, 158, 161, 172, 905; 408/83.5, 82, 80

[56] References Cited

U.S. PATENT DOCUMENTS

| | | |
|---|---|---|
| 1,710,462 | 4/1929 | Uhrig . |
| 3,157,068 | 11/1964 | Rickert . |
| 3,640,147 | 2/1972 | Fantoni ........................ 74/424.8 R |
| 3,710,659 | 1/1973 | Pagella et al. ................. 82/1.2 |
| 3,885,635 | 5/1975 | Menzel ........................ 173/146 |
| 4,573,379 | 3/1986 | Bald ........................... 82/1.2 X |
| 4,945,792 | 8/1990 | Gardner ........................ 82/1.5 X |
| 5,044,841 | 9/1991 | Biera et al. . |
| 5,655,422 | 8/1997 | Stolz et al. ..................... 82/1.2 |
| 5,692,421 | 12/1997 | Rohrberg ...................... 82/1.5 X |
| 5,791,836 | 8/1998 | Feufel ......................... 408/124 |

FOREIGN PATENT DOCUMENTS

| | | |
|---|---|---|
| 60081 | 2/1891 | Germany . |
| 1 029 645 | 5/1958 | Germany . |
| 20 10 200 | 9/1970 | Germany . |
| 27 28 975 | 1/1979 | Germany . |
| 31 28 228 | 5/1982 | Germany . |
| 34 40 398 | 6/1985 | Germany . |
| 228 470 | 10/1985 | Germany . |
| 41 00 330 | 7/1992 | Germany . |
| 0149140 | 9/1982 | Japan ......................... 82/1.5 |
| 926 536 | 5/1963 | United Kingdom . |

*Primary Examiner*—Andrea L. Pitts
*Assistant Examiner*—Henry W. H. Tsai
*Attorney, Agent, or Firm*—Flynn, Thiel, Boutell & Tanis, P.C.

[57] ABSTRACT

The invention relates to a position drive for a tool head for use in machine tools. The tool head comprises a base body (12), a tool shank (16) which protrudes axially over the base body (12) and is coupleable to a rotating machine spindle (14), and a thrust member (18) which is movable with respect to the base body (12) and which serves to move at least one tip holder or cutting tool (76). Further, an electric motor arrangement (24), which is coupleable to the thrust member (18), and a power supply device (26) for the motor arrangement (24) are positioned on the base body (12). In order to ensure a compact construction having an efficient motor arrangement, a hollow shaft (50) is borne rotatable about an axis of the base body (12), which is concentric with respect to a displacement axis (52) of the thrust member (18), and the hollow shaft (50) has an internal thread which engages in an external thread (42) of the thrust member (18). The hollow shaft (50) has a toothed ring (62) which is positioned concentric with respect to the external thread (42), for the engagement of at least one gear (70) which is positioned on a driven shaft (68) of the motor arrangement (24).

17 Claims, 6 Drawing Sheets

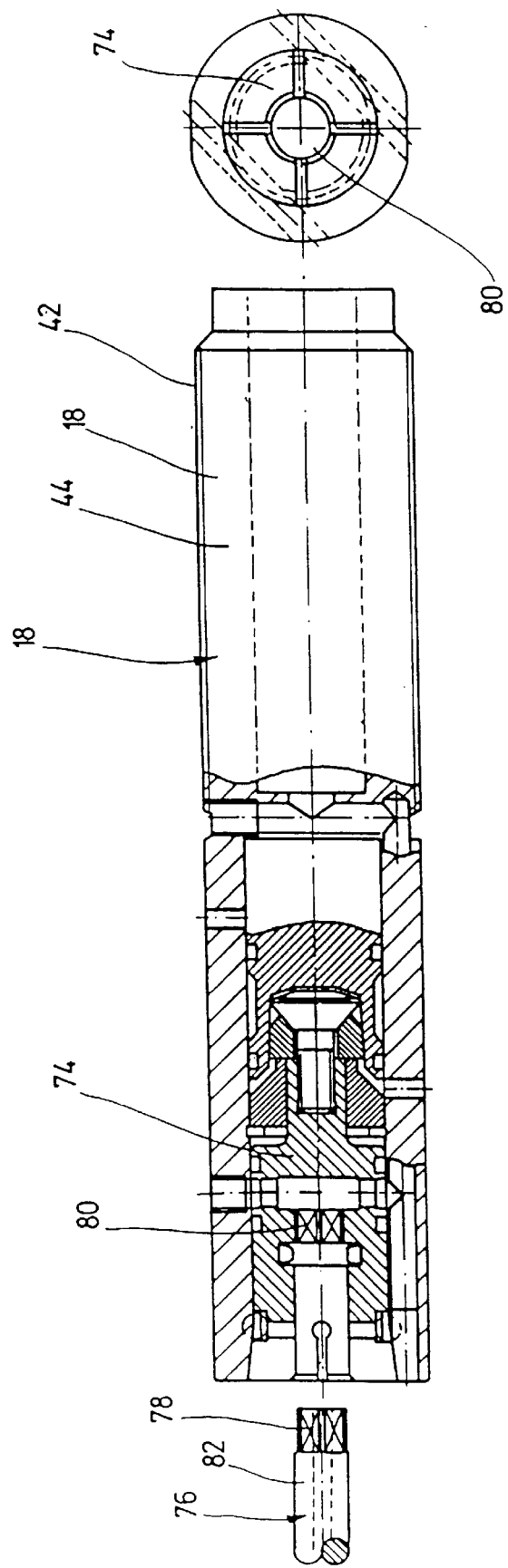

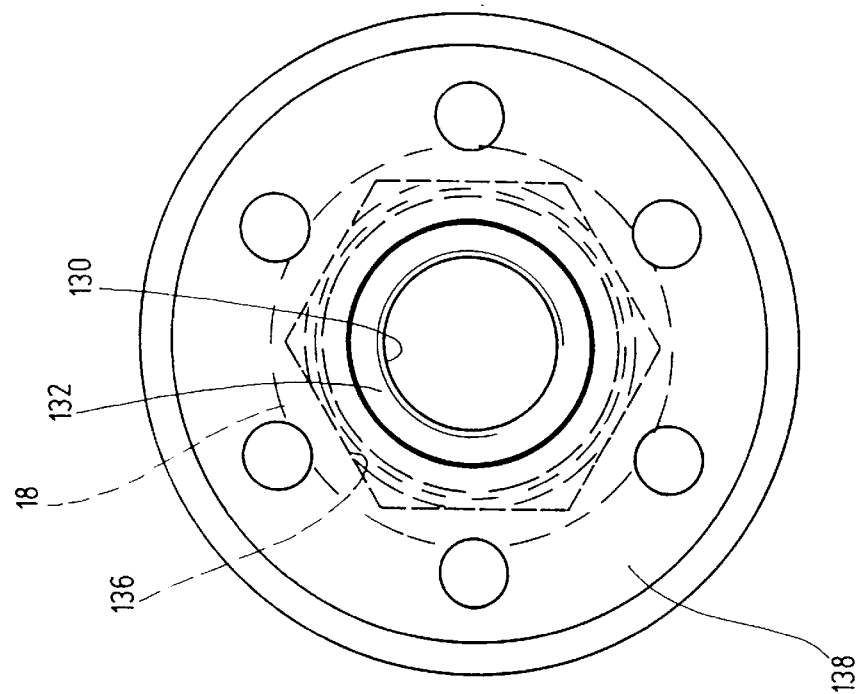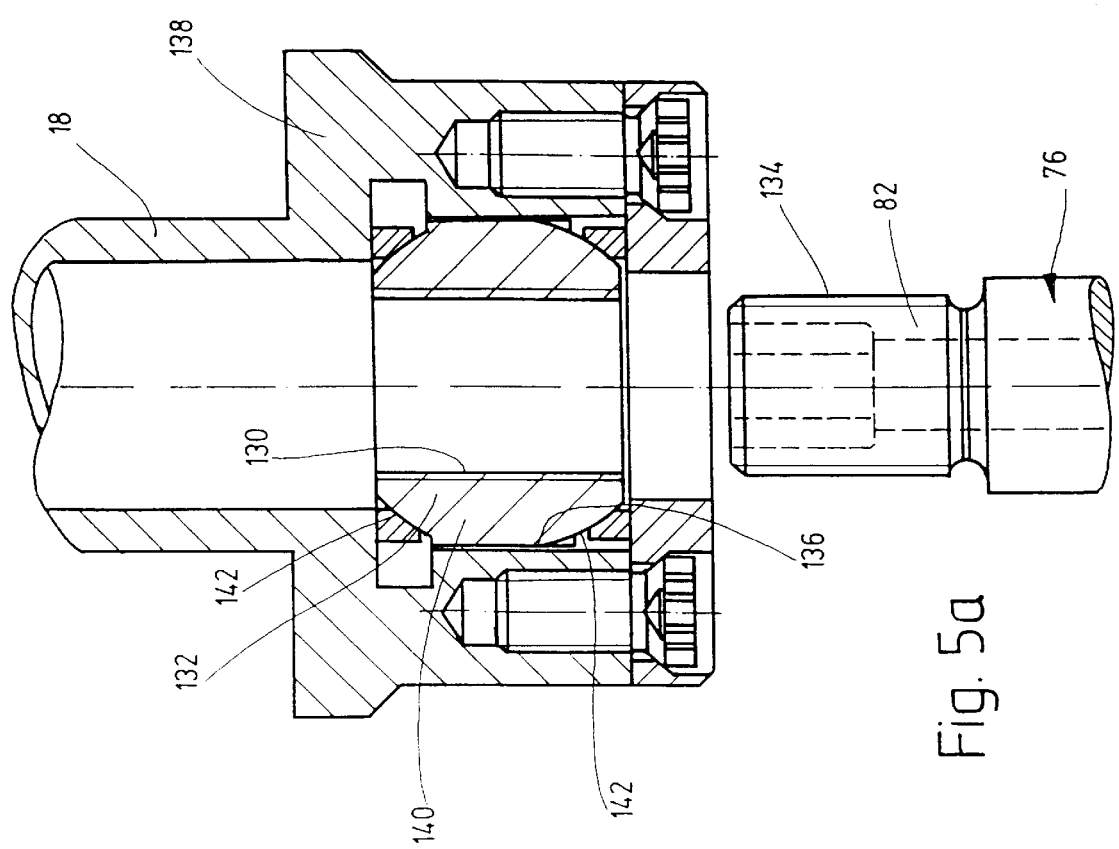
Fig. 5b
Fig. 5a

5,967,007

POSITION DRIVE, IN PARTICULAR FOR USE IN MACHINE TOOLS, AND TOOL HEAD HAVING SUCH A POSITION DRIVE

FIELD OF THE INVENTION

The invention relates to a position drive, in particular for use in machine tools, comprising at least one transmission element which is movable with respect to a base body, the transmission element being provided especially for the displacement of a cutting tool or of a cutting tip carrier, an electric motor arrangement which is positioned on the base body and can be coupled to the transmission element, and a power supply device for the motor arrangement.

BACKGROUND OF THE INVENTION

A tool head for use in machine tools is known (U.S. Pat. No. 3,710,659), the position drive of which has a centrally positioned electric drive motor with an axially aligned drive shaft for driving sliders which are movable perpendicular to the axis of rotation of the tool head. A transfer of the drive principle to other applications is not easily possible. Moreover, the efficiency of the known drive principle with its centrally positioned drive motor is not sufficient for many applications.

Based on this, it is the object of the invention, to develop a position drive of the type described above, which has a broad field of applications and which is suited to be used in machine tools for machining centers.

SUMMARY OF THE INVENTION

The solution according to the invention is based on the use of a hollow shaft which is borne rotatably in the base body and drivable by means of the motor arrangement. There is a drive unit available which is compactly built yet efficient, which can be used for different applications with different objects, and which is especially well suited to be used in machine tools for machining centers.

A first variant of the invention provides that the transmission element is formed to be a thrust member which is movable with respect to the base body, while the hollow shaft is borne rotatable about an axis of the base body, which is concentric with respect to a displacement axis of the thrust member, and that the hollow shaft has an internal thread which engages in an external thread of the thrust member.

In an advantageous or alternative embodiment of the invention, the hollow shaft has a toothed ring which is positioned concentric with respect to the external thread, for the engagement of at least one gear which is positioned on a driven shaft of the motor arrangement. In order to increase the efficiency of the motor, the motor arrangement has a plurality of electric motors which are distributed over the circumference of the hollow shaft, and the drive shafts of which each carry a gear which meshes with a toothed ring of the hollow shaft, and which are drivable in unision by the control electronics. The electric motors are positioned at equal circumferential distances in a base-body-fixed motor block with their driven shafts in parallel with respect to the axis of the hollow shaft. They are formed to be e.g. stepper motors or servo motors which are driveable by means of a common NC-control.

Between the hollow shaft and a base-body-fixed part, for instance the motor block, there is advantageously positioned a sensor for monitoring the speed and direction of rotation of the hollow shaft, which is preferably formed to be an incremental transmitter. Instead of the sensor, an encoder which is positioned on one of the electric motors may be provided for monitoring the speed and direction of rotation of the hollow shaft.

In order to ensure an optimal force transfer between the electric motors and the hollow shaft, the toothed ring is formed to be an internal gear ring, the diameter of which is larger than that of the internal thread.

In a preferred application of the position drive according to the invention, an exchangeable cutting head is positioned removably on the base body, which has a central opening and/or a guide bushing at its front side for the insertion of a reaming or drilling tool which is connectable to the thrust member. To this end, the thrust member carries a coupling element, which is positioned at the front side of and within the base body, for the insertion of a reaming or drilling tool which extends through a central opening at the front side of the base body or of the exchangeable cutting head and which is retractable into a hollow space of the base body or of the exchangeable cutting head. The coupling element is advantageously formed to be a collet chuck sleeve.

In a preferred embodiment of the invention, the coupling element has an internal thread for receiving the tool shank which has a complementary external thread. The coupling element is advantageously borne non-rotatably and unmovably in a head piece of the thrust member and has free play there, and preferably has a polygonal driver portion and two spherical calottes which adjoin the driver portion in opposite directions. Due to the degrees of freedom of play, it ensures that no constraining forces act on the tool.

A reamer for working on a tappet guide bushing of a cylinder head may be clamped or screwed into the coupling element, while the exchangeable cutting head carries a cutting tip preferably having an adjustable work angle for spot facing a valve seat ring which is coaxial to the tappet guide bushing. The exchangeable cutting head may additionally carry at least one further cutting tip for creating an inner and/or outer bevel delimiting the valve seat.

In a further preferred application of the invention, there are provided a cutting tip holder which is borne on the base body rotatable about an axis which is perpendicular to the direction of displacement of the thrust member, and transmission means which translate the thrust movement of the thrust member into a rotary movement of the cutting tip holder, wherein the cutting tip holder, the thrust member, and the transmission means may form a thrust crank. The tool head may in this case be used as a ball turning head, in which the cutting tip holder carries at least one cutting tip which has a cutting edge for ball turning.

In order to be able to use the position drive in a plane or slanted slider head, two sliders which are displaceable on the base body in opposite directions transverse or slanted with respect to the direction of displacement of the thrust member are provided, of which at least one slider has a tool reception. Furthermore, transmission means which translate the thrust movement of the thrust member into a displacement movement of the slider are provided. In this, the transmission means can be formed by helical gearings which mesh in pairs and are fixed to the thrust guide and to the slider.

The power supply device for the electric motors and the measuring and control electronics advantageously have an inductive current and data transfer path which has a primary coil positioned in a coil housing at the machine side and a secondary coil which is positioned at the tool head side in a coil housing which surrounds the tool shank in a ring-like manner, wherein the coil housings are separated from each other by an air gap when the tool shank is coupled to the machine spindle. Primary or secondary electronics for power conditioning and/or stabilization, which are connected to the primary and secondary coils, respectively, are advantageously positioned in the coil housing at the machine side and/or tool head side.

BRIEF DESCRIPTION OF THE DRAWINGS

In the following, the invention is further described with the aid of some embodiments schematically shown in the drawing, in which

FIGS. 4a and 4b show the thrust member with collet chuck sleeve in a partially cut side view and in a top view;

FIGS. 5a and 5b show the thrust member with a coupling element which has an internal thread in a partially cut side view and in a top view;

DETAILED DESCRIPTION

Figure 1:
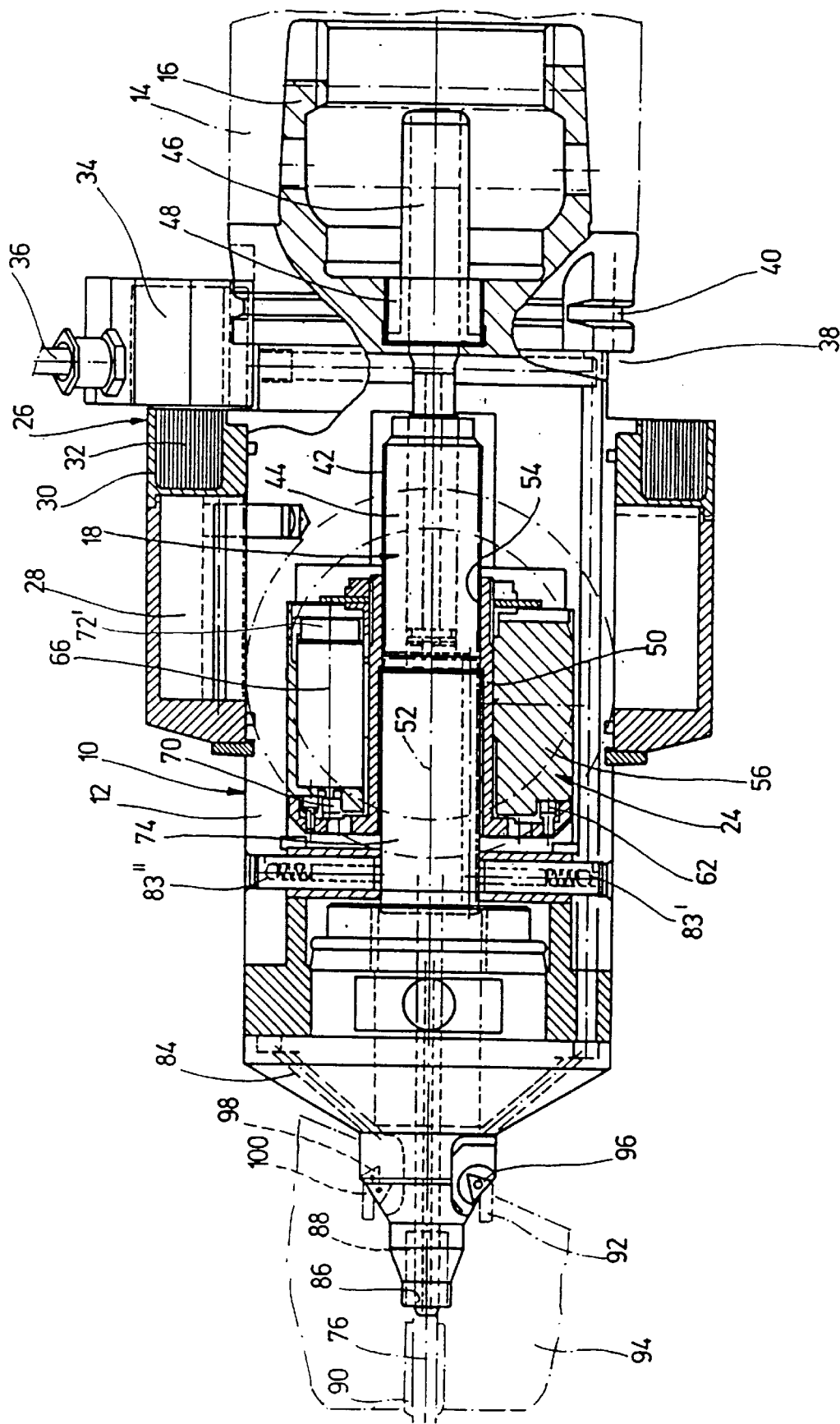
FIG. 1 shows an axial section through a tool head for finishing valve seat rings and tappet guide bushings in cylinder heads.

The tool heads 10 shown in the drawing mainly consist of a base body 12, a tool shank which protrudes axially over the base body 12 and is coupleable to a motor-drivable, rotating machine spindle 14 of a machine tool, an axially movable thrust member 18 which is positioned axial centrally in the base body 12 for displacing at least one tip carrier or cutting tool, an electric motor arrangement 24 which is positioned in the base body 12 and which is coupleable to the thrust member 18, and a power supply device 26 for the motor arrangement 24 and measuring and control electronics 28 which are positioned in the base body.

The power supply device 26 consists of a coil housing 30, in which there is a secondary coil 32, which is embedded in a mechanically resilient synthetic or resin material, with accompanying stabilizing electronics. The secondary coil 32 is part of an inductive transfer path. The primary coil of the inductive transfer path and the affiliated current conditioning electronics are positioned in a housing 34 at the machine side, which engages radially outside of the tool shank 16 into the free axial space between the front face of the machine spindle 14 and the free front face of the coil housing 30 at the tool head side. The electronics on the primary side are connected to a power supply (not shown) by means of a cable 36. The coil housing 34 on the machine side extends in a segment-like manner only by approximately 70° over the circumference of the tool shank 16 and leaves free the major part of the circumference of the shank, forming a free space 38, for the access of a tool gripper for an automatic changing of tools. The tool head 10 is gripped during the tool changing at the driver groove 40 and displaced axially with respect to the machine spindle 14 when the tool couple is loosened.

The thrust member 18 has a threaded body 44 with an external thread 42, which is axially guided in a non-rotatable manner in a thrust guide 48 which is conected to the base body. A hollow shaft 50, which has a complementary internal thread 54 engaged in the external thread 42 of the threaded body 44, is borne in the base body 12 rotatably about a rotation axis which is concentric with respect to the displacement axis 52 of the thrust member 18. The hollow shaft 50 is borne rotatable and unmovable in axial and radial plain bearings 58, and has at its front end a ring flange 60 with an internal gear ring 62 which is positioned radially outside of the internal thread 54 on the side of the motor block 56. The toothed ring forming the internal gear ring 62 is connected to the ring flange 60 by means of screws 64.

Figure 3:
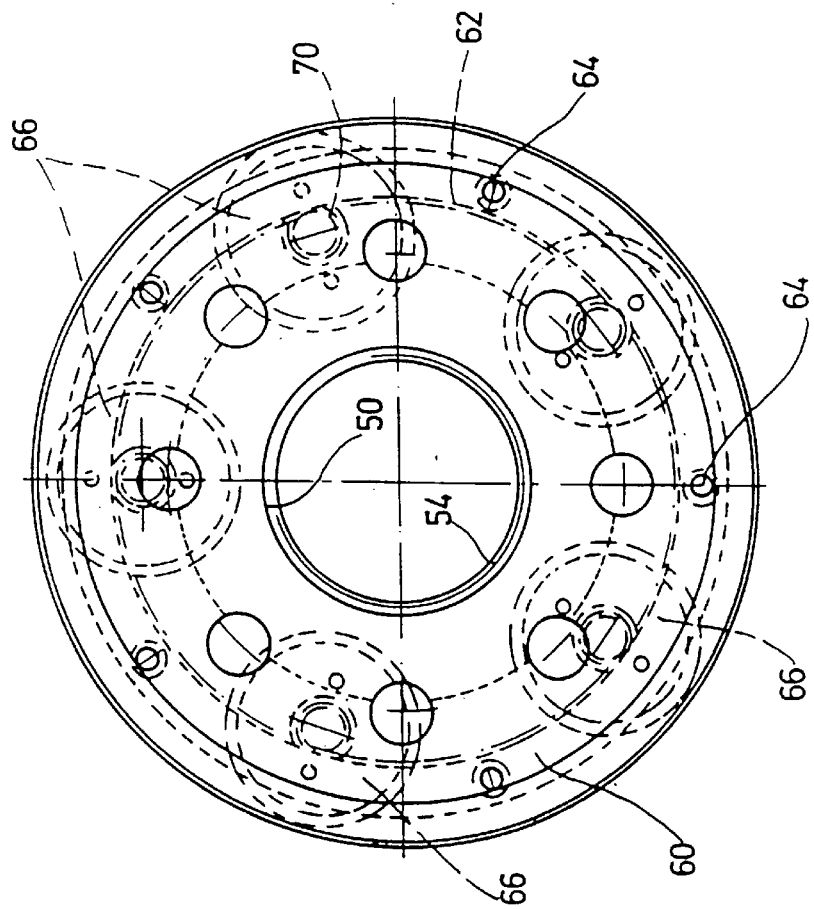
FIG. 3 shows a top view of the position drive according to FIG. 2.
Figure 2:
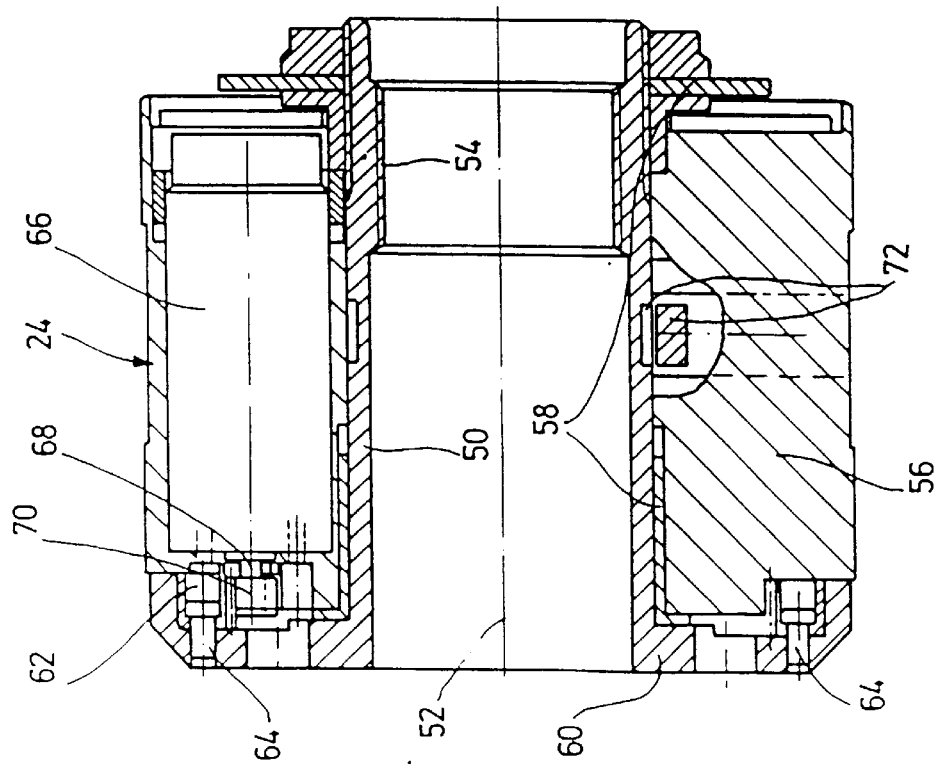
FIG. 2 shows a section through the position drive of the tool head according to FIG. 1 in an enlarged representation.

A plurality, in the embodiment of FIG. 3 five, of numerically controlled electric motors, preferably stepper motors, are positioned axially parallely aligned in the motor block 56 so that their gears 70, which are positioned on the corresponding driven shaft 68, together mesh with the internal gear ring 62 which is fixed on the hollow shaft. The control of the individual stepper motors is effected NC-controlled by way of the inductive transfer path 32, 34. A sensor 72, which is formed to be an incremental transducer, for monitoring the speed and direction of rotation is positioned in the region between the motor block 56 and the hollow shaft 50. Alternatively, an encoder 72' which is connected to one of the motors 66 may be provided for monitoring the speed and direction of rotation.

In the embodiment shown in FIG. 1, 4a, and 4b the tool head is intended to be used for finishing valve seat rings 92 and tappet guide bushings 90 of a cylinder head 94. To this end, the thrust member 18 is rigidly connected to a clamping chuck 74 which is positioned at the face side within the base body 12 and which is formed to be a collet chuck sleeve, and which is to be fitted with a reamer 76. As can be seen especially in FIGS. 4a and b, the reamer 76 is inserted into the chuck 74, and it is held there in a non-rotatable manner with its key surface 78 in the polygonal bushing 80 and clamped there with its shank 82. The clamping and loosening is advantageously performed from the outside with a mechanically actuated tension jack or an air actuated impulse tensioner 83', 83".

The embodiment shown in FIGS. 5a and b differs from the embodiment of FIGS. 4a and b in that instead of the chuck 74 a coupling element 132 which has an internal thread 130 is provided, into whose internal thread 130 the reamer 76 can be screwed with its shank 82 which has a complementary external thread 134. The coupling element 132 is positioned non-rotatably and unmovably in a bushing 136 of a broadened head piece 138 which is formed onto the thrust member 18. To this end, the coupling element has a driver portion with a hexagonal outline and two spherical calottes 142 which adjoin the driver portion at opposite ends, while the bushing 136 in the thrust member 18 has an inner contour which is complementary to the coupling element 132. By a floating bearing of the coupling element 132 in the bushing 136 it is attained that no unwanted constraining forces act on the reamer 76 during the work. The tool head shown in FIG. 1 additionally carries an exchangeable cutter head 84 which is removably connected to the front face of the base body 12 and which has a central opening 86 and a guide bushing 88 at its front side for the insertion of a reamer 76 which is connected to the chuck 74. The reamer is intended to be used for working on a tappet guide bushing 90 of a cylinder head 94, which is shown by the dash-dotted line in FIG. 1. For spot facing the valve seat ring 92 of the cylinder head 94 an angularly adjustable cutting tip is positioned on the exchangeable cutter head 84. Moreover, the exchangeable cutter head 84 carries two further cutting tips 98, 100 for creating outer and inner bevels which delimit the valve seat. The tappet guide bushing is reamed out by the reamer 76 which is clamped in the chuck 74 and axially movable with the thrust member 18, after the valve seat in the valve seat ring 92 and the protecting bevels of the valve seat are precision machined in the same mounting of the tool 10. The order of machining may also be reversed. The important thing is, that the cutting tips have no contact with the valve seat during the reaming operation, and that the reamer does not intrude into the tappet guide bushing during the work on the valve seat.

Figure 6:
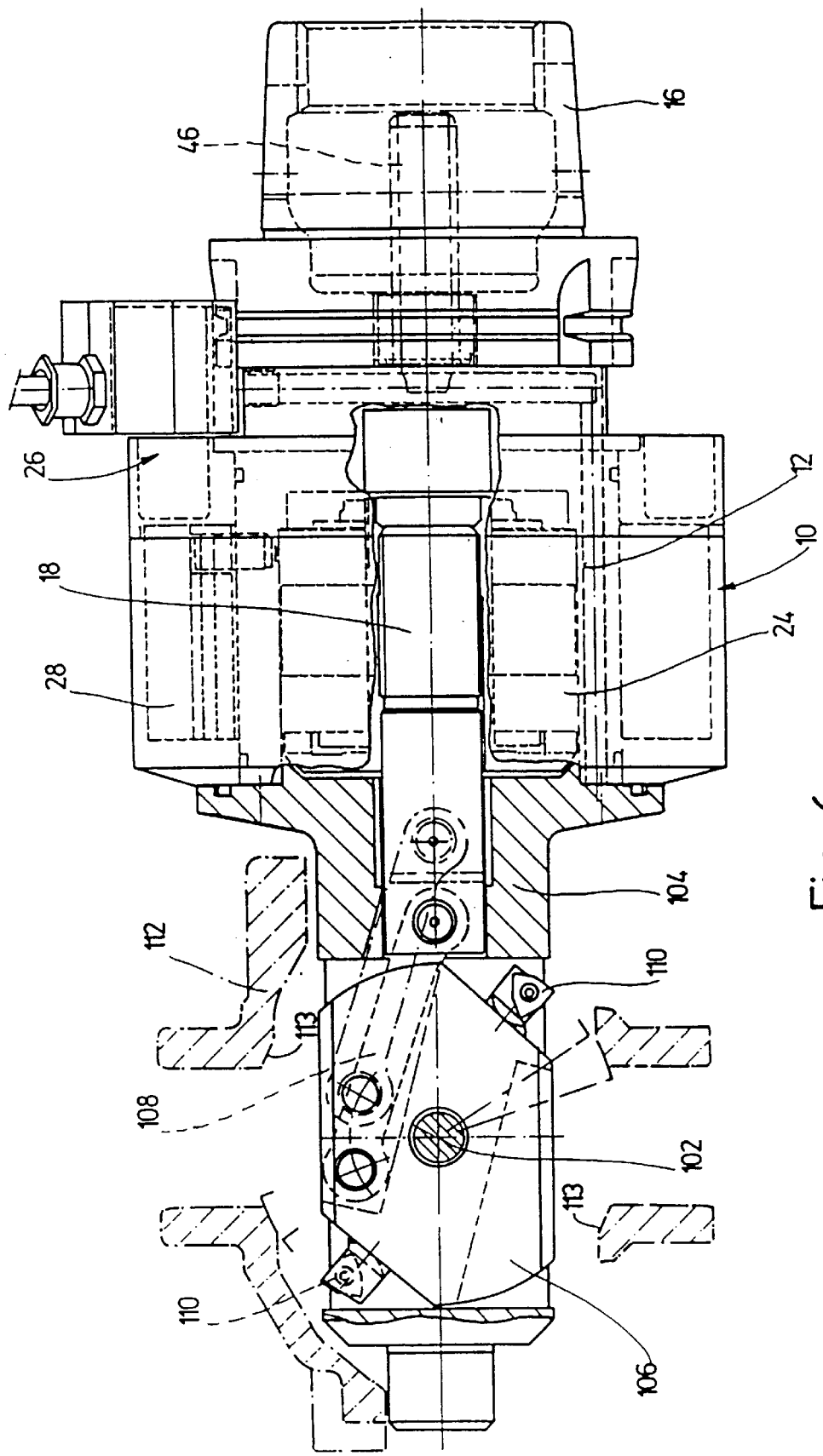
FIG. 6 shows a tool head which is formed to be a ball turning head in a partially cut side view.

The tool head 10 shown in FIG. 6 is formed to be a ball turning head. To this end, it has a cutting tip holder 106 which is borne on a base body top 104 and is rotatabe about an axis of rotation 102 which is aligned perpendicularly with respect to the displacement axis 52 of the thrust member 18. The cutting tip holder 106 is rotated by means of the thrust member 18 and the connecting rod 108. The cutting tip holder 106 carries two diametrically opposed cutting tips 110 which have cutting edges for spherical turning, with which concentric spherical calottes can be turned into the work piece 113.

Figure 7:
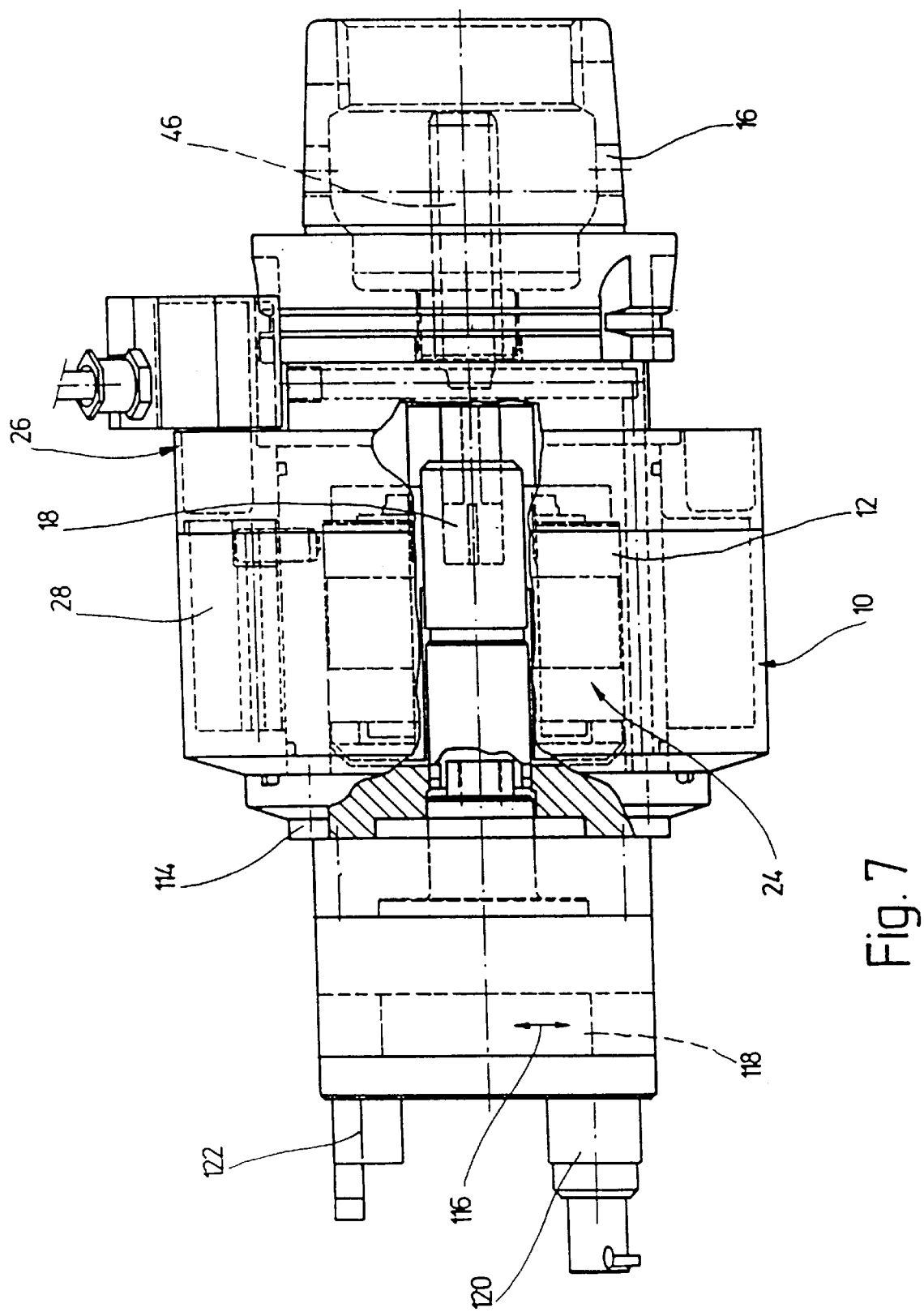
FIG. 7 shows a tool head which is formed to be a plane turning head in a partially cut side view.

In the embodiment shown in FIG. 7, the tool head 10 is formed to be a plane turning head. To this end, it has a top 114 with two sliders 118 which are displaceable against each other perpendicularly with respect to the displacement direction 52 of the thrust member 18 in the direction of the double arrow 116. One of the sliders 118 carries a tip holder 120 and the other a counterweight 122 for balancing purposes. Between the thrust member 18 and the sliders 118 transmission means (not shown) are positioned, which translate the thrust movement of the thrust member into the displacement movements of the sliders. These transmission means may for instance be formed by helical gearings which mesh in pairs and are fixed to the thrust member and the sliders, as shown and descibed for instance in DE-OS 27 28 975.

A substantial advantage of the position drives described above is that they are fitted with an efficient motor arrangement 24, which makes the actuating mechanisms on the machine side superfluous and therefore enables an automatic changing of tools and a use in machines with a rotating machine spindle.

In summary the following is to be stated: The invention relates to a position drive for a tool head for use in machine tools. The tool head comprises a base body 12, a tool shank 16 which protrudes axially over the base body 12 and is coupleable to a rotating machine spindle 14, and a thrust member 18 which is movable with respect to the base body 12 and which serves to move at least one tip holder or cutting tool 76. Furthermore, an electric motor arrangement 24 which is coupleable to the thrust member 18, a power supply device 26 for the motor arrangement 24, and measuring and control electronics are positioned on the base body 12. In order to ensure a compact construction having an efficient motor arrangement, a hollow shaft 50 is provided, which is borne rotatable about an axis of the base body 12, which is concentric with respect to a displacement axis 52 of the thrust member 18, and which is driven by the motor arrangement, and the hollow shaft 50 has an internal thread which engages in an external thread 42 of the thrust member 18 as well as a toothed ring 62 which is positioned concentric with respect to the external thread 42, for the engagement of at least one gear 70 which is positioned on a driven shaft 68 of the motor arrangement 24.

I claim:

1. A tool head having a position drive for use in machine tools, comprising at least one transmission element movable with respect to a base body, the transmission element being provided for the displacement of a cutting tool or of a cutting tip carrier, the tool head further comprising an electric motor arrangement positioned in the base body and coupled to the transmission element, and further comprising a power supply device for the motor arrangement, wherein a hollow shaft, which is drivable by means of the motor arrangement and which is coupled to the transmission element, is borne rotatably and axially unmovably on the base body, the transmission element comprising a thrust member which is movable with respect to the base body in parallel to the axis of the hollow shaft, and the hollow shaft is borne rotatably about an axis of the base body which is concentric with respect to a displacement axis of the thrust member, and the hollow shaft has an internal thread which engages in an external thread of the thrust member, wherein an exchangeable cutting head carrying at least one cutting tip is positioned removably at the front face of the base body and has a central opening at its front side for the insertion of the cutting tool which is connectable to the thrust member.

2. A tool head having a position drive according to claim 1, wherein the thrust member carries a coupling element, which is positioned at the front side of and within the base body, for the insertion of the cutting tool which extends through the central opening at the front side of the base body or of the exchangeable cutting head and which is retractable into a hollow space of the base body or of the exchangeable cutting head.

3. A tool head having a position drive according to claim 1, wherein the power supply device has an inductive current and data transfer path which has a primary coil positioned in a first coil housing at a machine side and a secondary coil which is positioned at a tool head side in a second coil housing which surrounds a tool shank in a ring-like manner, wherein the first and second coil housings are separated from each other by an air gap when the tool shank is coupled to a machine spindle, the cutting tool comprising a reaming or drilling tool.

4. The tool head of claim 3, wherein primary or secondary electronics for power conditioning are connected to the primary and secondary coils, respectively, and are positioned in the first and second coil housings at the machine side or tool head side.

5. A tool head for use in machine tools, comprising a base body, a tool shank which protrudes axially over the base body and is coupled to a rotating machine spindle, a thrust member movable with respect to the base body and which serves to move a cutting tool, an electric motor arrangement positioned in the base body and coupled to the thrust member, a power supply device for the motor arrangement, an exchangeable cutting head positioned at the front side of the base body and which carries at least one cutting tip, and a coupling element positioned within the base body, which is axially movable with the aid of the motor arrangement, and which serves to accept the cutting tool which penetrates a central opening at the front of the exchangeable cutting head and which is retractable into the inside of the exchangeable cutting head.

6. The tool head of claim 5, wherein the coupling element is a clamping chuck.

7. The tool head of claim 5, wherein the coupling element has an internal thread for receiving the tool shank which has a complementary external thread.

8. The tool head of claim 7, wherein the coupling element is borne non-rotatably and unmovably in a head piece of the thrust member and has free play therein.

9. A tool head having a position drive for use in machine tools, comprising at least one transmission element movable with respect to a base body, the transmission element being provided for the displacement of a cutting tool or of a cutting tip carrier, the tool head further comprising an electric motor arrangement positioned in the base body and coupled to the transmission element, and further comprising a power supply device for the motor arrangement, wherein a hollow shaft, which is drivable by means of the motor arrangement and which is coupled to the transmission element, is borne rotatable and axially unmovably on the base body, the transmission element comprising a thrust member which is movable with respect to the base body in parallel to the axis of the hollow shaft, and the hollow shaft is borne rotatable about an axis of the base body which is concentric with respect to a displacement axis of the thrust member, and the hollow shaft has an internal thread which engages in an external thread of the thrust member, wherein an exchangeable cutting head carrying at least one cutting tip is positioned removably at the front face of the base body and has a central opening at its front side for the insertion of the cutting tool which is connectable to the thrust member, the cutting tool comprising a reaming or drilling tool, wherein the coupling element has-an internal thread for receiving a tool shank which has a complementary external thread, wherein the coupling element is borne non-rotatably and unmovably in a head piece of the thrust member and has free play therein, and wherein the coupling element has a polygonal driver portion and two spherical calottes which adjoin the driver portion in opposite directions.

10. The tool head of claim 5, wherein the cutting tool comprises a reamer for working on a tappet guide bushing of a cylinder head that is connectable to the coupling element.

11. The tool head of claim 10, wherein the exchangeable cutting head carries the cutting tip having an adjustable work angle for precision turning of a valve seat ring which is coaxial to the tappet guide bushing.

12. The tool head of claim 11, wherein the exchangeable cutting head carries at least one further cutting tip for creating a bevel delimiting the valve seat ring.

13. A tool head for use in machine tools, comprising at least one transmission element movable with respect to a base body, the transmission element being provided for the displacement of a cutting tool, the tool head further comprising an electric motor arrangement positioned in the base body and coupled to the transmission element, and further comprising a power supply device for the motor arrangement, wherein a hollow shaft, which is drivable by means of the motor arrangement and which is coupled to the transmission element, is borne rotatably and axially unmovably on the base body, the transmission element comprising a thrust member which is movable with respect to the base body in parallel to the axis of the hollow shaft, and the hollow shaft is borne rotatable about an axis of the base body which is concentric with respect to a displacement axis of the thrust member, and the hollow shaft has an internal thread which engages in an external thread of the thrust member, wherein a cutting tip holder which is borne on the base body rotates about an axis which is perpendicular to the direction of displacement of the thrust member, and transmission means which translate the thrust movement of the thrust member into a rotary movement of the cutting tip holder.

14. The tool head of claim 13, wherein the cutting tip holder, the thrust member, and the transmission means form a thrust crank.

15. The tool head of claim 13, wherein the cutting tip holder carries at least one cutting tip which functions as a ball turning tip.

16. The tool head of claim 15, wherein the cutting tip holder carries two diametrically opposed cutting tips which function as ball turning tips.

17. A tool head having a position drive for use in machine tools, comprising at least one transmission element movable with respect to a base body, the transmission element being provided for the displacement of a cutting tool or of a cutting tip carrier, the tool head further comprising an electric motor arrangement positioned in the base body and coupled to the transmission element, and further comprising a power supply device for the motor arrangement, wherein a hollow shaft, which is drivable by means of the motor arrangement and which is coupled to the transmission element, is borne rotatably and axially unmovable on the base body, the transmission element comprising a thrust member which is movable with respect to the base body in parallel to the axis of the hollow shaft, and the hollow shaft is borne rotatably about an axis of the base body which is concentric with respect to a displacement axis of the thrust member, and the hollow shaft has an internal thread which engages in an external thread of the thrust member, wherein two sliders are displaceable on the base body in opposite directions transverse or slanted with respect to the direction of displacement of the thrust member, of which at least one slider has a tool reception, and transmission means which translate the thrust movement of the thrust member into a displacement movement of the at least one slider.

* * * * *